Patented June 13, 1933

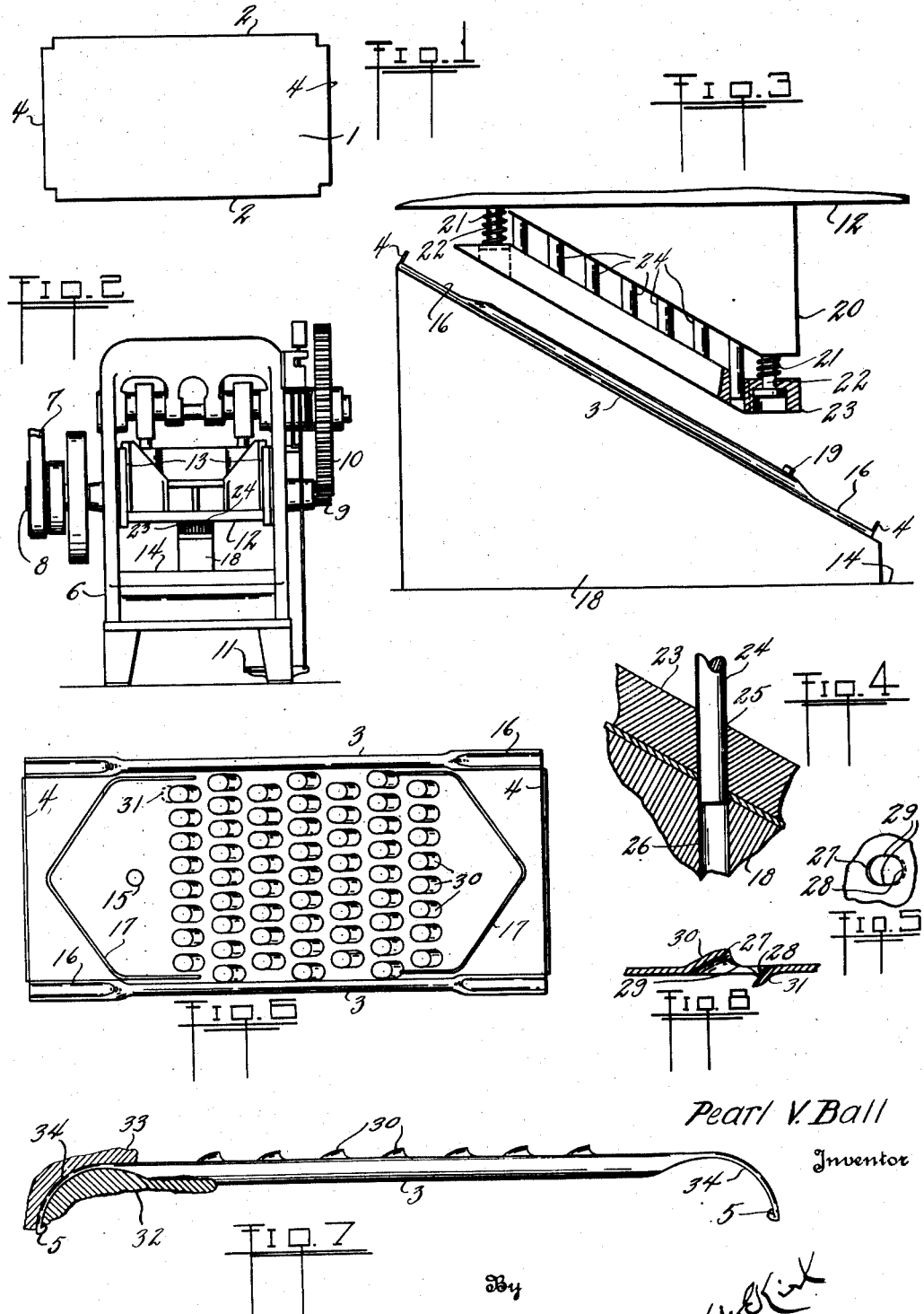

1,913,357

UNITED STATES PATENT OFFICE

PEARL V. BALL, OF TOLEDO, OHIO, ASSIGNOR TO HARRY W. KRAMER, OF TOLEDO, OHIO

METHOD OF MAKING SHREDDERS

Application filed June 3, 1931. Serial No. 541,754.

This invention relates to sheet metal reforming.

This invention has utility when incorporated in shredder manufacture.

Referring to the drawing:

Fig. 1 is a plan view of a blank for the manufacture of a shredder hereunder;

Fig. 2 is a view of a press for performing operations upon the blank;

Fig. 3 is a view, on an enlarged scale, of dies for use in the press of Fig. 2 in carrying out piercing and sharpening operations hereunder;

Fig. 4 is a detail view of a blank perforation or piercing in side elevation;

Fig. 5 is a plan view of an opening from the piercing operation;

Fig. 6 is a bottom plan view of the shredder in flat form;

Fig. 7 is a side elevation of the shredder terminally bowed and in finished condition; and Fig. 8 is a detail view in section of an embossed hole or cutting opening in the shredder.

Blank 1 of sheet metal is desirably of stock to resist weathering as well as attack from fruit and vegetable juices. Tinned black iron may answer, but non-corrosive or stainless steel is preferred. From the blank 1, longitudinal extensions 2 are rolled inward to form beads 3 along the side edges of the finished shredder. Terminal extensions 4 are in-folded to form end beads 5 for the shredder.

In carrying out the series of operations hereunder, power press 6 may be used. Such is shown driven by belt 7 for driving shaft 8 extending thru the frame of the press 6 to pinion 9 in mesh with gear 10 as a speed reduction drive controllable for a cycle of operations by treadle 11. In operation for a cycle, plunger 12 descends as directed by guides 13, toward table 14.

The blank 1 may have the extensions 2 first upset; they may then be incurled to bead form with openings 15 pierced in the blank beyond the normal shredding area. This opening has utility as a hang-up for the finished article. The beads 3 may have their termini given flattening 16 and the extensions 4 turned up against the ends of the flattenings 16. Curling down of the ends to form the beads 5 may now occur with a tightening of such up against the portions 16 and the embossing 17 impart a decorative appearance as well as transverse stiffening for the shredder termini.

The article may now be placed with the beads upward on lower die member 18 with projection 19 thru the opening 15 to serve as locating means for the work. Opposing this die member 18 on the table 14 is die member 20 carried by the plunger 12. Springs 21 about pins 22, normally thrust guide plate 23 into clamping position upon the article of work. Fixed in the die member 20 are a plurality of piercing dies 24 protruding into openings 25 in the plate 23. When the plate 23 stops at article clamping position, the continued descent of the plunger 12 causes the dies 24 to progress thru the plate 23, effect angle piercing or cutting thru the work and enter openings 26 in the member 18 aligned with the guide openings 25. This hole cutting or piercing gives a projecting beveled lip 27 at the initiating portion of the piercing die travel into the stock with an overhang beveled lip 28 opposite thereto, these merging with each other at straight cut portions 29.

It is thus to be seen that in the longitudinal extent of the shredder there is accomplished at the single press operation, effective sharpening cuttings or piercings for the plurality of openings. Furthermore this is accomplished with dies of a substantial contour which may be economically produced and the upkeep on which may be a minimum. Upon the recover or upward travel of the plunger 12, the compression helical springs 21 serve as strippers as the dies 24 are retracted thereinto. Further lifting of the plunger 12 leaves the stock as thus pierced on the member 18 to be replaced by a succeeding article.

To give a maximum capacity as well as improve the sharpening effectiveness, especially in such shredding operations as the housewife may wish to conduct with vegetables, even of a leafy character, offsetting or embossing may be had. This is preferably carried out by placing the article on the die with the beaded margin downward. The plunger in its descent then forces the plane of the article away from lips 27 in forming enlargements 30 as a cutting edge reinforcement as well as guide channel for cut or shredded material. This offsetting may even extend to affect the lip 28 by forming enlargement 31. Between the edges 27, 28, there is increased capacity. With the embossing 31 minor to the embossing 30, the opposite sides of the shredder may thus serve to give two degrees of cutting action.

The angle of initiating the piercing at the entrance side of the sheet metal stock is acute, as is the leaving angle at the opposite side. It is to be noted that the offsetting or embossing occurs in the obtuse angle regions. Efficient die condition may be easily maintained at all times for the piercing and embossing operations with a uniformity in the character of the product.

The shredder as an article of manufacture is still in a general flat form, except for the marginal beads and the intermediate embossings and offsettings. A contribution to shredder stability, especially against weaving or bending out of a plane, is established hereunder. To this end the side beads 3 are crowded down or compacted by the action of a grooved die member 32, preferably at the same time die member 33 coacts therewith in imparting bow form 34 to the ends of the shredder at the regions of the embossings 17. The two beads 3 and the two bows 34 as thus set simultaneously impart a peripheral stiffness in a maintained plane for the effective shredder region. There is thus defeated any tendency of internal stresses in the sheet metal induced by the offsettings or from other causes, to disturb the property that the shredder may lay flat at all times.

What is claimed and it is desired to secure by Letters Patent is:

1. In the manufacture of shredders from sheet metal, sharpening by cutting therethru in the plane of the metal at an acute angle, and pressing said sharpened edge out of the plane of the metal.

2. In the manufacture of shredders from sheet metal, sharpening by cutting out therethru in the plane of the metal at an acute angle simultaneously a plurality of openings, and simultaneously offsetting into arch form the plane of the metal from a common side of the several openings.

3. In the manufacture of shredders from sheet metal, simultaneously cutting therethru a plurality of openings in the plane of the metal by cutting at an acute angle to said plane, and offsetting the metal into the obtuse angle marginal portions of the openings.

4. In the manufacture of shredders from sheet metal, piercing the metal to form openings by causing relative travel to effect said piercing at an acute angle to the plane of the metal, and offsetting the sheet metal from its plane at one margin of the piercings in one direction and at an opposite margin in the opposite direction.

5. In the manufacture of shredders from marginally beaded sheet metal, piercing a plurality of openings therethru at an acute angle through the metal to the plane of the metal, embossing the metal adjacent the piercings, and further press treating the metal for stiffening including compacting the beading and bowing the ends.

In witness whereof I affix my signature.

PEARL V. BALL.